2,021,796

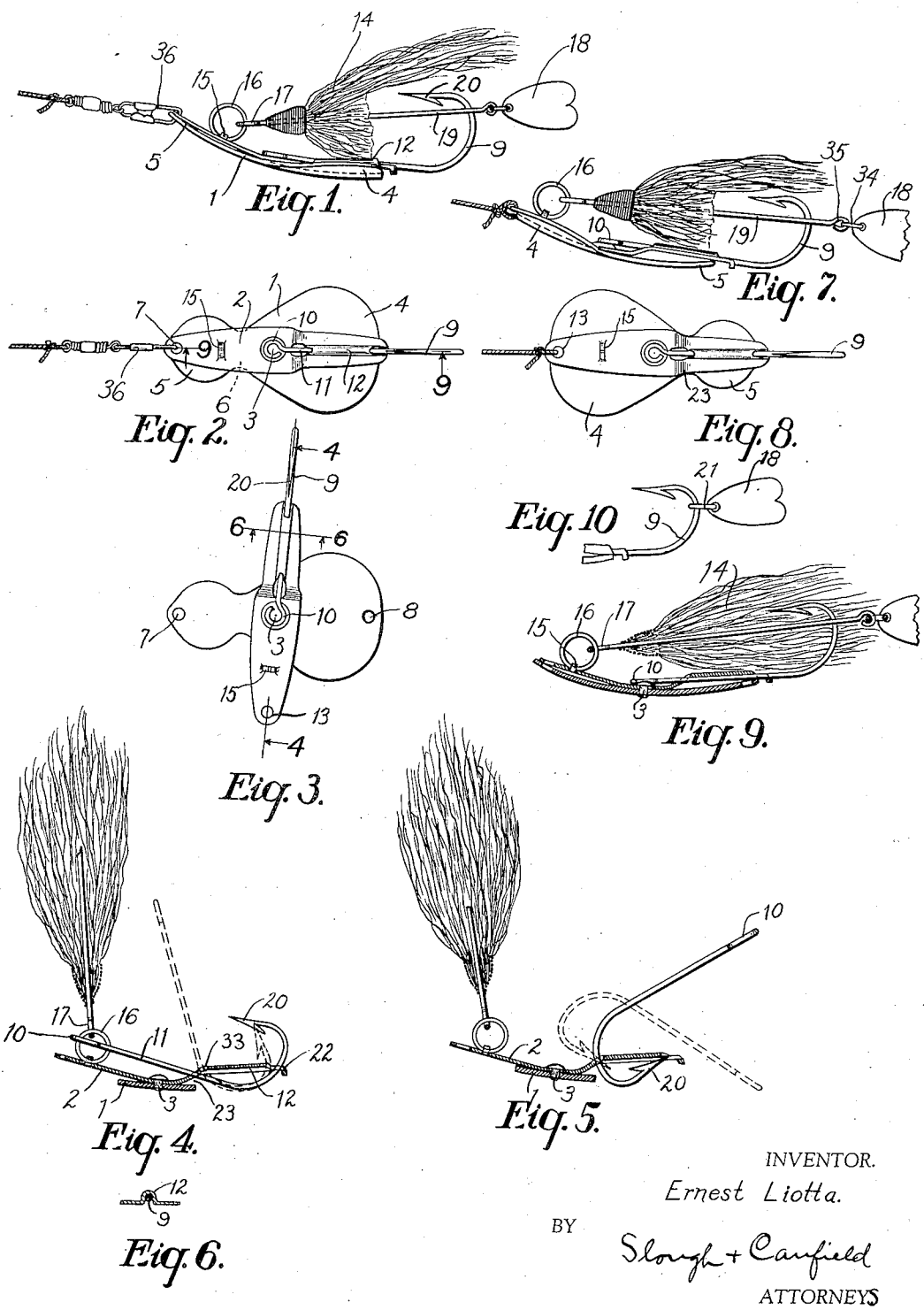
Nov. 19, 1935.  E. LIOTTA  2,021,796
FISHING LURE
Filed Dec. 12, 1934
INVENTOR.
Ernest Liotta.
BY Slough + Canfield
ATTORNEYS Patented Nov. 19, 1935

UNITED STATES PATENT OFFICE 2,021,796

FISHING LURE

Ernest Liotta, Cleveland, Ohio, assignor to The American Fork & Hoe Company, Cleveland, Ohio, a corporation of Ohio Application December 12, 1934, Serial No. 757,157

9 Claims. (Cl. 43—42)

My invention relates to artificial bait and relates more particularly to artificial bait particularly designed for use in casting and trolling.

An object of my invention is to provide an artificial bait with adjusting means to vary its action.

Another object of my invention is to provide an artificial bait of the type which is so formed that the hook may be easily and quickly secured or attached to or detached from it.

Another object of my invention is to provide an artificial bait of the type which is so formed that the hook may be automatically set when a "strike" is made.

A further object of my invention is to provide an artificial bait which is simple in construction, economical to manufacture and efficient in use.

Other objects of my invention and the invention itself will become apparent by reference to the following description of an embodiment of my invention and to the accompanying drawing illustrating the said embodiment.

Referring to the drawing:

Fig. 1 is a side elevational view of an artificial bait which is an embodiment of my invention, a portion of the bucktail element thereof being shown as broken away to reveal the interior parts;

Fig. 2 is a top plan view of the embodiment of Fig. 1 with the bucktail lure element omitted from the view;

Fig. 3 is a top plan view of the embodiment of Fig. 1 illustrating the hook support or carrier in a transversely extending or hook-changing position;

Fig. 4 is a longitudinal sectional view of the improved bait of my invention taken on the line 4—4 of Fig. 3 and illustrating the hook affixed to the carrier in operative position;

Fig. 5 is a longitudinal sectional view of the improved bait of my invention similar to the view shown in Fig. 4 but the present view illustrates the hook in an intermediate position effected while removing a hook from the carrier or applying a hook thereto;

Fig. 6 is an enlarged cross-sectional view taken on the line 6—6 of Fig. 3;

Fig. 7 is a view of the lure of Fig. 1 with the parts thereof in alternatively adjusted position;

Fig. 8 is a top plan view of the lure having its carrier in reversed position as also shown in Fig. 7;

Fig. 9 is a longitudinal sectional view of the embodiment of Figs. 7 and 8, the view being taken on the line 9—9 of Fig. 2;

Fig. 10 is a fragmentary view of an alternative method of mounting a bangle, spinner or the like which is alternative to the manner of securing a similar lure element as illustrated in the other figures.

The improved bait of my invention comprises a preferably elongated plate 1 with a hook support 2 preferably in the form of an elongated strip of sheet metal secured to the upper side of the plate, being journaled on a pin or rivet 3 passing through said hook supporting strip 2 and said plate 1, preferably at the longitudinal middle of the plate disposed medially transversely thereof, said rivet pressing the intermediate parts of the plate 1 and support 2 together against the inherent resiliency tending to separate the mid portions of said parts.

While the plate 1 may be of various forms, in the embodiment illustrated, it is shown as being of unitary construction, formed of a single piece of sheet metal of the desired thickness, and comprising a main generally pear-shaped spoon portion 4 and a smaller head portion 5 with a relatively narrow neck portion 6 joining the forward portion 5 to the rear portion 4 of the body. The lure body or plate 1 is preferably concavo-convex on all lines of cross-section, this particularly pertaining to the enlarged rear spoon portion of the body. However, the body might be made flat in other embodiments. The plate 1 is provided with perforations 7 and 8 medially disposed at either end. Said perforations are preferably disposed at equal distances from the pin or screw 3 upon which the carrier 2 is journaled.

The hook support or carrier 2 is provided with means for detachably holding the hook 9 in the illustrated operative position, said means cooperating with the eye 10 and shank 11 of the hook 9, and comprising the upwardly deflected channel-shaped portion 12, the hook carrier 2 being medially perforated at adjacent the end of said channel-shaped portion 12, the perforation 13 being spaced from the rivet 3 the same distance as are the perforations 7 and 8 of the plate 1 so that when the carrier is rotated the perforation 13 may be brought into alignment with the plate perforation 7 or alternatively with the plate perforation 8.

In this manner the action of the lure may be varied by attaching the line carrying means in one instance to the lure by means of aligned perforations 7 and 13 as shown in Figs. 1 and 2 wherein the head portion 5 of the bait is the forward portion of the lure, or by attaching the line carrying means to aligned perforations 13 and 8, as shown in Figs. 7 and 8, whereby the spoon portion 4 becomes the forward end of the lure.

The lure is illustrated with a bucktail lure element 14 which has a universal connection with an eyelet 15 pressed upwardly in the mid forward portion of the carrier 2 from the body of the sheet metal carrier, an intermediate ring 16 being interlinked with a terminal eye 17 of the bucktail lure and said eyelet 15. If desired, a bangle 18 may be universally connected by a similar ring 34 and eye 35 universal joint arrangement to the rear of the bucktail at the rear end of the wire 19, which wire 19 preferably passes through the entire bucktail. The bucktail 14 and bangle 18 will trail and serve to shield the barb 20 from ready view of the fish when fishing, and will also guard the hook from entanglement with weeds or the like when the lure is passing through the water.

In Fig. 10, I have illustrated a modified form wherein the bangle is universally connected by a ring 21 onto the hook 9, said ring being telescoped over the hook and longitudinally slidable over the arcuately bent rear portion thereof. In such cases, the wire 19, which in the other embodiment extended through the bucktail lure element, is unnecessary and is eliminated. It will be understood also that instead of a bangle in the form as illustrated any alternative form of attractive lure element may be substituted, such as a spinner or the like.

As shown in Fig. 4, the hook 9 is placed in operative position on the carrier 2 by first projecting the barb end 20 successively through the perforations 33 and 22 of the lure carrier and continuing the threading of the hook shank through said perforations until the straight portion of the shank is snugly embraced within the channel 12 as specifically shown in Fig. 6, the eye 10 of the hook 9 automatically taking the position illustrated, particularly in Figs. 1, 2, 3, 7, 8 and 9, where it rests on the rounded head of the pin or screw 3 upon which the carrier is journaled. The hook eye 10 will be resiliently pressed downwardly onto the top of said pin or rivet 3 by virtue of the fact that the carrier 2 is normally bowed upwardly at 23 from its intermediate or axially disposed portion toward its rear end through which the barb end of the hook passes, the downward pressure of the hook eye 10 being attended by an upward pressure against the hook shank 11 by the rear end of the carrier 2, and the hook shank is reactively pressed against the upwardly disposed inner surface of the channeled hook shank-receiving portion 12 of the carrier 2.

When a "strike" is made, the eye 10 of the hook 9 may be automatically moved from its preliminary position over the head of the screw or rivet 3, and the eye of the hook will advance rearwardly of the pin or rivet 3 until it engages the walls of the carrier perforation 33, including the front edges of the channel 12.

The hook 9 may be readily removed and another hook substituted therefor by rotating the carrier 2 to the position shown in Figs. 3, 4 and 5, and then grasping the barb end 20 of the hook and thrusting it longitudinally to displace the eye 10 forwardly of the screw or rivet 3, and then, when the upwardly extending curved portion of the hook engages the rear end edge of the channel, rotating the eye portion 10 in such a way as to invert the hook and to position the eye 10 of the hook inwardly of the channel 12 the final action of removing the hook 9 consisting of grasping the eye end 10 of the hook and pushing it forwardly of the carrier 2 to remove the barb 20 from the channel by successively passing it through the two perforations which join the channel, the emerging hook being indicated by dotted lines in Fig. 5. Replacement of the same or substituting a different hook is accomplished by the same steps of operation performed in inverse order, as heretofore described.

In Figs. 1–2 and 7–8, I show the lure with the line attached thereto in the position is occupies when passing through the water, when the hook carrier is rotated to its two oppositely directed alternative positions. The difference in form of the two ends of the plate body are such that when the line is affixed by means of the perforation 8 of the plate body and 13 of the carrier, as shown in Fig. 7, the lure will ride at a different level in the water at a given speed of travel than when the line is affixed to the small end as shown in Fig. 1.

I may employ a snap swivel connector 36 to interconnect the line to the aligned perforations 20 13—8 or 13—7, as shown in Figs. 1 and 2, or I may connect the line directly alternatively through the two sets of perforations, as desired.

Either end of the plate is the forward or rear end of the plate, according to the adjustment of the carrier, but that in all cases the rear end of the carrier is that end adjacent which the hook barb is positioned.

When the spoon end 4 of the plate makes the connection through its perforation 8 to the line, due to its greater area and concavo-convex form, the lure will ride higher in the water than where the line is connected to the smaller end of the plate. However, the depth adjustment may be varied by variations in the form of the two ends of the plate body, as will be apparent since the spoon portion of the body might have downturned portions which would cause the lure to ride lower in the water when the line is attached to such portion as will be understood by those first in this art.

Having thus described my invention, I am aware that numerous and extensive departures may be made therefrom but without departing from the spirit of my invention.

I claim:

1. An artificial lure comprising a pair of superposed plates, the lower plate being in the form of a spoon, a hook secured to the upper plate, said upper plate having a plurality of relatively rotatable positions relative to the lower plate.

2. An artificial lure comprising a spoon, a hook carrier rotatably affixed thereto intermediate its ends, and means for attaching a line to said lure adjacent either end of said spoon.

3. A lure comprising a plate, a hook, said plate having a plurality of aligned perforations through which a hook may be threaded, said plate being of resilient material and being so formed as to be resiliently distorted when a hook is threaded through said perforations and placed in operative position on said plate to retain said hook in position while fishing, a spoon adapted to be secured to said plate in a number of different alternative positions relative to the plate, said lure being adapted for connection to a line at alternative portions of said lure.

4. A lure comprising a body and a hook carrier rotatably connected together, said hook being removably secured to said carrier when the carrier is rotated to a given rotated position relative to said plate and being irremovable therefrom when said carrier is rotated to a different position relative to said plate.

5. A lure comprising relatively rotatable spoon and hook carrier plates, said hook carrier plate being superposed over said spoon plate and secured thereto at an intermediate portion of the plate, said carrier and spoon plates adaped to be secured together in a plurality of angularly different relative positions, said lure being adapted to have a line secured thereto adjacent a given end of said carrier, but adjacent different joints of said spoon according to the relative adjustment of the spoon and carrier.

6. An artificial lure comprising a hook carrier and a spoon rotatably secured together by their mid-portions, said spoon having provisions for attaching a line thereto at a plurality of points adjacent its peripheral edge and angularly differently disposed from the mid point of the spoon, said carrier being adapted to be rotated on said spoon to position its hook in an opposite direction from the selected point of attachment of said line.

7. A lure comprising a spoon plate body and a hook carrier rotatably connected together, said hook being removably secured to said carrier when the carrier is rotated to a given rotated position relative to said plate and being irremovable therefrom when said carrier is rotated to a different position relative to said plate, and a weed deflecting lure element connected to said carrier at the opposite end thereof from the barb of the carried hook.

8. A lure comprising relatively rotatable spoon and hook carrier plates, said hook carrier plate being superposed over said spoon plate and secured thereto at an intermediate portion of the plate, said carrier and spoon plates adapted to be secured together in a plurality of angularly different relative positions, said lure being adapted to have a line secured thereto adjacent a given end of said carrier, but adjacent different points of said spoon according to the relative adjustment of the spoon and carrier, and a weed deflecting lure element connected to said carrier at the opposite end thereof from the barb of the carried hook.

9. An artificial lure comprising a hook carrier and a spoon rotatably secured together by their mid portions, said spoon having provisions for attaching a line thereto at a plurality of points adjacent its peripheral edge and angularly differently disposed from the mid point of the spoon, said carrier being adapted to be rotated on said spoon to position its hook in an opposite direction from the selected point of attachment of said line.

ERNEST LIOTTA.